US008179986B2

(12) United States Patent
Kimura et al.

(10) Patent No.: US 8,179,986 B2
(45) Date of Patent: May 15, 2012

(54) MULTICARRIER MODULATION SCHEME AS WELL AS TRANSMISSION APPARATUS AND RECEPTION APPARATUS USING THE SCHEME

(75) Inventors: Tomohiro Kimura, Osaka (JP); Yukihiro Omoto, Osaka (JP); Kenichi Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 899 days.

(21) Appl. No.: 12/158,825

(22) PCT Filed: Dec. 18, 2006

(86) PCT No.: PCT/JP2006/325165
§ 371 (c)(1),
(2), (4) Date: Jun. 23, 2008

(87) PCT Pub. No.: WO2007/080745
PCT Pub. Date: Jul. 19, 2007

(65) Prior Publication Data
US 2009/0268837 A1    Oct. 29, 2009

(30) Foreign Application Priority Data

Jan. 10, 2006    (JP) ................. 2006-002062

(51) Int. Cl.
*H04K 1/10*    (2006.01)
(52) U.S. Cl. ........ 375/260; 375/262; 375/267; 375/271; 375/299; 375/316; 455/101; 455/132
(58) Field of Classification Search .................. 375/259, 375/260, 267, 271, 295, 299, 306, 316, 322, 375/341, 350, 130, 135, 145–147, 150, 262, 375/342–346
See application file for complete search history.

(56) References Cited

U.S. PATENT DOCUMENTS

| | | | |
|---|---|---|---|
| 3,511,936 A | 5/1970 | Saltzberg | |
| 6,278,686 B1 | 8/2001 | Alard | |
| 6,292,462 B1 | 9/2001 | Cook et al. | |
| 7,894,325 B2 * | 2/2011 | Chadha et al. | ................ 370/203 |

(Continued)

FOREIGN PATENT DOCUMENTS

EP    0 734 132    9/1996
(Continued)

OTHER PUBLICATIONS

Russian Office Action issued Dec. 7, 2010 in corresponding Russian Patent Application No. 2008132877/09(041243) w/English translation.

(Continued)

*Primary Examiner* — Hirdepal Singh
(74) *Attorney, Agent, or Firm* — Wenderoth, Lind & Ponack, L.L.P.

(57)    ABSTRACT

In order is to generate a pilot signal for estimating a transmission characteristic of a transmission channel suitable for OFDM/OQAM multicarrier modulation, a phase reference pilot symbol of which a modulation amplitude is suppressed to zero, and an amplitude reference pilot signal obtained through modulation performed by using an amplitude known to a reception end are transmitted from a transmission end. Further, the transmission characteristic of the transmission channel is estimated and compensated using the phase reference pilot signal and the amplitude reference pilot signal at the reception end. Accordingly, it is possible to simplify a frame generation process performed at the transmission end, and reduce transmission power for the phase reference pilot signal.

17 Claims, 7 Drawing Sheets

SYMBOL

|  | m−2 | m−1 | m | m+1 | m+2 | m+3 | m+4 | m+5 |
|---|---|---|---|---|---|---|---|---|
| k−3 | × | × | × | × | × | × | × | × |
| k−2 | × | × | × | × | × | × | × | × |
| k−1 | × | × | × | × | × | × | × | × |
| CARRIER  k | ○ | ● | ○ | ● | ○ | ● | ○ | ● |
| k+1 | × | × | × | × | × | × | × | × |
| k+2 | × | × | × | × | × | × | × | × |
| k+3 | × | × | × | × | × | × | × | × |

○  PHASE REFERENCE PILOT SIGNAL
●  AMPLITUDE REFERENCE PILOT SIGNAL
×  DATA TRANSMISSION SIGNAL

U.S. PATENT DOCUMENTS

| | | | |
|---|---|---|---|
| 7,949,061 B2 * | 5/2011 | Tong et al. | 375/260 |
| 8,094,732 B2 * | 1/2012 | Jahan et al. | 375/260 |
| 2004/0032909 A1 | 2/2004 | Gonzalez et al. | |
| 2004/0233838 A1 * | 11/2004 | Sudo et al. | 370/208 |
| 2005/0105461 A1 | 5/2005 | Mitsugi | |
| 2005/0238109 A1 | 10/2005 | Koga et al. | |
| 2007/0121750 A1 * | 5/2007 | Shirakata et al. | 375/267 |
| 2009/0213949 A1 * | 8/2009 | Javaudin | 375/260 |

FOREIGN PATENT DOCUMENTS

| | | |
|---|---|---|
| JP | 52-151510 | 12/1977 |
| JP | 11-510653 | 9/1999 |
| JP | 11-512907 | 11/1999 |
| JP | 2004-509561 | 3/2004 |
| JP | 2004-509562 | 3/2004 |
| JP | 2005-311413 | 11/2005 |
| WO | 96/35278 | 11/1996 |
| WO | 02/25884 | 3/2002 |

OTHER PUBLICATIONS

S. B. Weinstein and Paul M. Ebert, "Data Transmission by Frequency-Division Multiplexing Using the Discrete Fourier Transform", IEEE Transaction on Communications, vol. COM-19, pp. 628-634, Oct. 1971.

Burton R. Saltzberg, "Performance of an Efficient Parallel Data Transmission System", IEEE Transaction on Communications, vol. COM-15, pp. 805-811, Dec. 1967.

R. Li and G. Stette, "Time-Limited Orthogonal Multicarrier Modulation Schemes", IEEE Transaction on Communications, vol. 43, pp. 1269-1272, Feb./Mar./Apr. 1995.

M. A. Tzannes, M.C. Tzannes, J. Proakis and P.N. Heller, "DMT Systems, DWMT Systems and Digital Filter Banks", IEEE International Conference on Communications, pp. 311-315, May 1994.

Botaro Hirosaki, "An Orthogonally Multiplexed QAM System Using the Discrete Fourier Transform" IEEE Transactions on Communications, vol. 29, No. 7, 1981.07, pp. 982-989.

International Search Report mailed Mar. 13, 2007 for International Application No. PCT/JP2006/325165.

* cited by examiner

F I G. 3
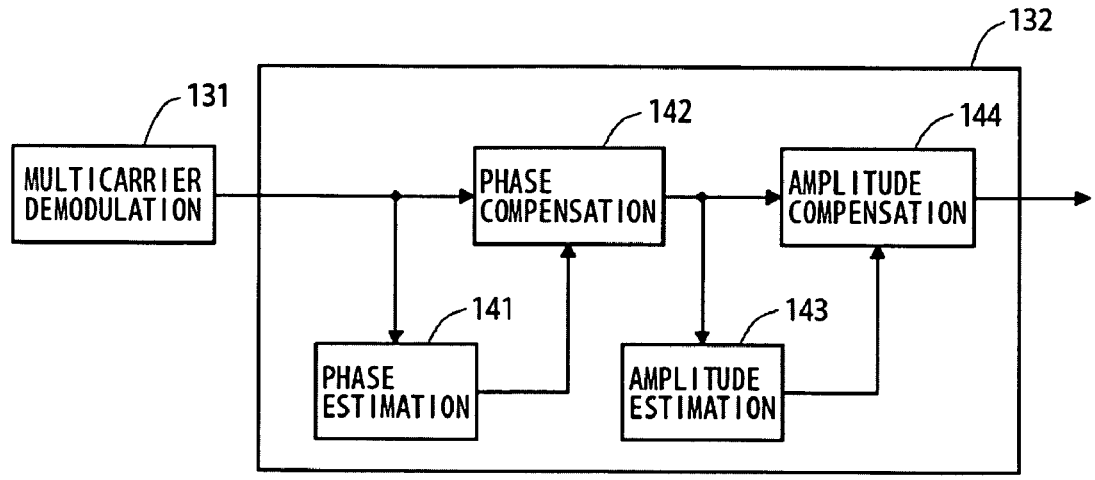
F I G. 4
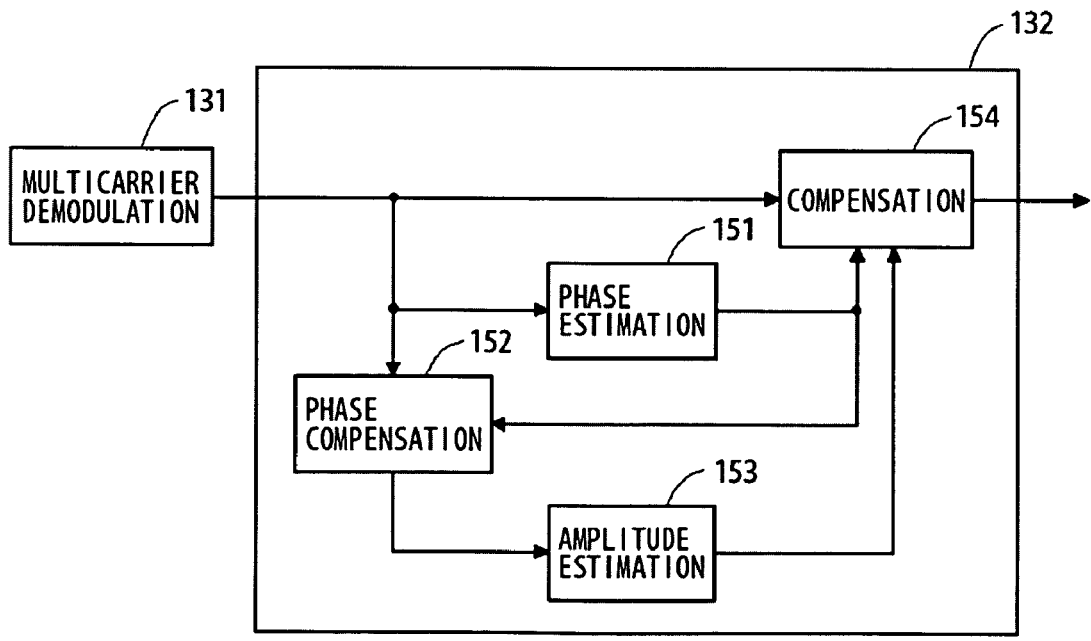

FIG. 5

SYMBOL

|  | | m-2 | m-1 | m | m+1 | m+2 | m+3 | m+4 | m+5 |
|---|---|---|---|---|---|---|---|---|---|
|  | k-3 | × | × | × | × | × | × | × | × |
|  | k-2 | × | × | × | × | × | × | × | × |
|  | k-1 | × | × | × | × | × | × | × | × |
| CARRIER | k | ○ | ● | ○ | ● | ○ | ● | ○ | ● |
|  | k+1 | × | × | × | × | × | × | × | × |
|  | k+2 | × | × | × | × | × | × | × | × |
|  | k+3 | × | × | × | × | × | × | × | × |

○ PHASE REFERENCE PILOT SIGNAL
● AMPLITUDE REFERENCE PILOT SIGNAL
× DATA TRANSMISSION SIGNAL

FIG. 6

SYMBOL

|  | | m-2 | m-1 | m | m+1 | m+2 | m+3 | m+4 | m+5 |
|---|---|---|---|---|---|---|---|---|---|
|  | k-3 | × | × | × | × | × | × | × | × |
|  | k-2 | × | × | × | × | × | × | × | × |
|  | k-1 | × | × | × | × | × | × | × | × |
| CARRIER | k | ○ | ○ | ○ | ○ | ○ | ○ | ○ | ○ |
|  | k+1 | × | × | × | × | × | × | × | × |
|  | k+2 | × | × | × | × | × | × | × | × |
|  | k+3 | × | × | × | × | × | × | × | × |

○ PHASE REFERENCE PILOT SIGNAL
× DATA TRANSMISSION SIGNAL

F I G. 7

SYMBOL

|  | | m−2 | m−1 | m | m+1 | m+2 | m+3 | m+4 | m+5 |
|---|---|---|---|---|---|---|---|---|---|
| | k−3 | × | × | ● | × | × | × | × | × |
| | k−2 | × | × | ○ | × | × | × | × | × |
| | k−1 | × | × | ● | × | × | × | × | × |
| CARRIER | k | × | × | ○ | × | × | × | × | × |
| | k+1 | × | × | ● | × | × | × | × | × |
| | k+2 | × | × | ○ | × | × | × | × | × |
| | k+3 | × | × | ● | × | × | × | × | × |

○ PHASE REFERENCE PILOT SIGNAL
● AMPLITUDE REFERENCE PILOT SIGNAL
× DATA TRANSMISSION SIGNAL

F I G. 8

SYMBOL

|  | | m−2 | m−1 | m | m+1 | m+2 | m+3 | m+4 | m+5 |
|---|---|---|---|---|---|---|---|---|---|
| | k−3 | × | × | ● | ○ | ● | ○ | × | × |
| | k−2 | × | × | ○ | ● | ○ | ● | × | × |
| | k−1 | × | × | ● | ○ | ● | ○ | × | × |
| CARRIER | k | × | × | ○ | ● | ○ | ● | × | × |
| | k+1 | × | × | ● | ○ | ● | ○ | × | × |
| | k+2 | × | × | ○ | ● | ○ | ● | × | × |
| | k+3 | × | × | ● | ○ | ● | ○ | × | × |

○ PHASE REFERENCE PILOT SIGNAL
● AMPLITUDE REFERENCE PILOT SIGNAL
× DATA TRANSMISSION SIGNAL

FIG. 9  PRIOR ART

SYMBOL

|  | | m+0 | m+1 | m+2 | m+3 | m+4 | m+5 | m+6 | m+7 | m+8 | m+9 | m+10 | m+11 |
|---|---|---|---|---|---|---|---|---|---|---|---|---|---|
| | k+0 | O | × | × | × | O | × | × | × | O | × | × | × |
| | k+1 | × | × | × | × | × | × | × | × | × | × | × | × |
| | k+2 | × | × | × | × | × | × | × | × | × | × | × | × |
| | k+3 | × | O | × | × | × | O | × | × | × | O | × | × |
| | k+4 | × | × | × | × | × | × | × | × | × | × | × | × |
| | k+5 | × | × | × | × | × | × | × | × | × | × | × | × |
| | k+6 | × | × | O | × | × | × | O | × | × | × | O | × |
| | k+7 | × | × | × | × | × | × | × | × | × | × | × | × |
| | k+8 | × | × | × | × | × | × | × | × | × | × | × | × |
| | k+9 | × | × | × | O | × | × | × | O | × | × | × | O |
| | k+10 | × | × | × | × | × | × | × | × | × | × | × | × |
| CARRIER | k+11 | × | × | × | × | × | × | × | × | × | × | × | × |
| | k+12 | O | × | × | × | O | × | × | × | O | × | × | × |
| | k+13 | × | × | × | × | × | × | × | × | × | × | × | × |
| | k+14 | × | × | × | × | × | × | × | × | × | × | × | × |
| | k+15 | × | O | × | × | × | O | × | × | × | O | × | × |
| | k+16 | × | × | × | × | × | × | × | × | × | × | × | × |
| | k+17 | × | × | × | × | × | × | × | × | × | × | × | × |
| | k+18 | × | × | O | × | × | × | O | × | × | × | O | × |
| | k+19 | × | × | × | × | × | × | × | × | × | × | × | × |
| | k+20 | × | × | × | × | × | × | × | × | × | × | × | × |
| | k+21 | × | × | × | O | × | × | × | O | × | × | × | O |
| | k+22 | × | × | × | × | × | × | × | × | × | × | × | × |
| | k+23 | × | × | × | × | × | × | × | × | × | × | × | × |
| | k+24 | O | × | × | × | O | × | × | × | O | × | × | × |

FIG. 10
PRIOR ART

| CARRIER | SYMBOL | | | | | | | | | | | |
|---|---|---|---|---|---|---|---|---|---|---|---|---|
| | | 1 | 2 | 3 | 4 | 5 | 6 | 7 | 8 | ·· | m-2 | m-1 | m |
| -26 | | | | ○ | ○ | × | × | × | × | ·· | | × | × |
| -25 | | | | ○ | ○ | × | × | × | × | ·· | × | × | × |
| -24 | | ○ | ○ | ○ | ○ | × | × | × | × | ·· | × | × | × |
| -23 | | | | ○ | ○ | × | × | × | × | ·· | × | × | × |
| -22 | | | | ○ | ○ | × | × | × | × | ·· | × | × | × |
| -21 | | | | ○ | ○ | ○ | ○ | ○ | ○ | ·· | ○ | ○ | ○ |
| -20 | | ○ | ○ | ○ | ○ | × | × | × | × | ·· | × | × | × |
| -19 | | | | ○ | ○ | × | × | × | × | ·· | × | × | × |
| -18 | | | | ○ | ○ | × | × | × | × | ·· | × | × | × |
| -17 | | | | ○ | ○ | × | × | × | × | ·· | × | × | × |
| -16 | | ○ | ○ | ○ | ○ | × | × | × | × | ·· | × | × | × |
| -15 | | | | ○ | ○ | × | × | × | × | ·· | × | × | × |
| -14 | | | | ○ | ○ | × | × | × | × | ·· | × | × | × |
| -13 | | | | ○ | ○ | × | × | × | × | ·· | × | × | × |
| -12 | | ○ | ○ | ○ | ○ | × | × | × | × | ·· | × | × | × |
| -11 | | | | ○ | ○ | × | × | × | × | ·· | × | × | × |
| -10 | | | | ○ | ○ | × | × | × | × | ·· | × | × | × |
| -9 | | | | ○ | ○ | × | × | × | × | ·· | × | × | × |
| -8 | | ○ | ○ | ○ | ○ | × | × | × | × | ·· | × | × | × |
| -7 | | | | ○ | ○ | ○ | ○ | ○ | ○ | ·· | ○ | ○ | ○ |
| -6 | | | | ○ | ○ | × | × | × | × | ·· | × | × | × |
| -5 | | | | ○ | ○ | × | × | × | × | ·· | × | × | × |
| -4 | | ○ | ○ | ○ | ○ | × | × | × | × | ·· | × | × | × |
| -3 | | | | ○ | ○ | × | × | × | × | ·· | × | × | × |
| -2 | | | | ○ | ○ | × | × | × | × | ·· | × | × | × |
| -1 | | | | ○ | ○ | × | × | × | × | ·· | × | × | × |
| 0 | | | | | | | | | | | | | |
| 1 | | | | ○ | ○ | × | × | × | × | ·· | × | × | × |
| 2 | | | | ○ | ○ | × | × | × | × | ·· | × | × | × |
| 3 | | | | ○ | ○ | × | × | × | × | ·· | × | × | × |
| 4 | | ○ | ○ | ○ | ○ | × | × | × | × | ·· | × | × | × |
| 5 | | | | ○ | ○ | × | × | × | × | ·· | × | × | × |
| 6 | | | | ○ | ○ | × | × | × | × | ·· | × | × | × |
| 7 | | | | ○ | ○ | ○ | ○ | ○ | ○ | ·· | ○ | ○ | ○ |
| 8 | | ○ | ○ | ○ | ○ | × | × | × | × | ·· | × | × | × |
| 9 | | | | ○ | ○ | × | × | × | × | ·· | × | × | × |
| 10 | | | | ○ | ○ | × | × | × | × | ·· | × | × | × |
| 11 | | | | ○ | ○ | × | × | × | × | ·· | × | × | × |
| 12 | | ○ | ○ | ○ | ○ | × | × | × | × | ·· | × | × | × |
| 13 | | | | ○ | ○ | × | × | × | × | ·· | × | × | × |
| 14 | | | | ○ | ○ | × | × | × | × | ·· | × | × | × |
| 15 | | | | ○ | ○ | × | × | × | × | ·· | × | × | × |
| 16 | | ○ | ○ | ○ | ○ | × | × | × | × | ·· | × | × | × |
| 17 | | | | ○ | ○ | × | × | × | × | ·· | × | × | × |
| 18 | | | | ○ | ○ | × | × | × | × | ·· | × | × | × |
| 19 | | | | ○ | ○ | × | × | × | × | ·· | × | × | × |
| 20 | | ○ | ○ | ○ | ○ | × | × | × | × | ·· | × | × | × |
| 21 | | | | ○ | ○ | ○ | ○ | ○ | ○ | ·· | ○ | ○ | ○ |
| 22 | | | | ○ | ○ | × | × | × | × | ·· | × | × | × |
| 23 | | | | ○ | ○ | × | × | × | × | ·· | × | × | × |
| 24 | | ○ | ○ | ○ | ○ | × | × | × | × | ·· | × | × | × |
| 25 | | | | ○ | ○ | × | × | × | × | ·· | × | × | × |
| 26 | | | | ○ | ○ | × | × | × | × | ·· | × | × | × |

MULTICARRIER MODULATION SCHEME AS WELL AS TRANSMISSION APPARATUS AND RECEPTION APPARATUS USING THE SCHEME

TECHNICAL FIELD

The present invention relates to a multicarrier modulation scheme capable of estimating transmission characteristic of a transmission channel by using a pilot signal as well as a transmission apparatus and a reception apparatus using the scheme, and more particularly, to a multicarrier modulation scheme capable of performing the aforementioned estimation in a suitable manner when OFDM/OQAM (Offset Quadrature Amplitude Modulation) multicarrier modulation is used, and a transmission apparatus and a reception apparatus using the scheme.

BACKGROUND ART

Multicarrier modulation is widespread for radio communication or wire communication. The multicarrier modulation is a scheme in which transmission data is divided, and the divided transmission data are assigned to a plurality of carriers, respectively, and the carriers corresponding to the respective transmission data are modulated, and the modulated carriers are multiplexed. The multicarrier modulation called OFDM (Orthogonal Frequency Division Multiplexing), which is a type of multicarrier modulation, is widespread for practical use in the fields of digital terrestrial television broadcasting, wireless LAN (Local Area Network), xDSL (Digital Subscriber Line), power line communication (PLC: Power Line Communication), and the like. As specific exemplary applications, DVB-T is used for digital terrestrial television broadcasting, IEEE802.11a is used for wireless LAN, ADSL is used for xDSL, Home Plug is used for power line communication. In the following description, in particular, the multicarrier modulation using the aforementioned typical OFDM is referred to as OFDM/QAM (Quadrature Amplitude Modulation) multicarrier modulation or simply as OFDM/QAM, so as to be distinguishable from other multicarrier modulations.

(As to OFDM/QAM)

The principle of the OFDM/QAM is described in Non-Patent Document 1.

The OFDM/QAM is a multicarrier modulation for individually subjecting a plurality of carries having different frequencies from each other to complex vector modulation at every symbol transmission cycle, and multiplexing the modulated carriers. When $T_s$ represents a time interval of a symbol, a plurality of the symbols being continuous in the time direction, and $f_s$ represents a frequency interval between carriers adjacent to each other in the frequency direction, a general expression representing a transmission signal for the OFDM/QAM can be represented by (Equation 1).

$$s(t) = \text{Re}\left[\sum_m \sum_k d_{m,k} g(t - mT_s) e^{j2\pi(f_c t + kf_s(t - mT_s))}\right] \quad \text{[Equation 1]}$$

In (Equation 1), m represents a symbol number, k represents a carrier number, $f_c$ represents a reference frequency of a carrier, and t represents a time. $d_{m,k}$ represents a complex vector indicating transmission data to be transmitted on the k-th carrier in the m-th symbol. $g(t-mT_s)$ represents a window function for the m-th symbol, which is obtained by time-shifting a window function g(t) to the m-th symbol. For example, the window function g(t) is defined as (Equation 2).

$$g(t) = \begin{cases} 1, & -T_g < t \le T_u \\ 0, & \text{otherwise} \end{cases} \quad \text{[Equation 2]}$$

One symbol interval include a guard interval and an effective symbol interval. In (Equation 2), $T_g$ represents a guard interval length, $T_u$ represents an effective symbol interval length, and a relationship between $T_g$ and $T_u$ satisfies $T_s = T_g + T_u$. Further, a relationship between the effective symbol interval length $T_u$ and a carrier frequency interval $f_s$ satisfies $T_u = 1/f_s$.

In the OFDM/QAM, a signal corresponding to the effective symbol interval length $T_u$ is extracted from the symbol interval $T_s$ including the guard interval $T_g$ and demodulated in receiving process performed at the reception end.

In a wireless mobile communication, a multipath propagation often causes a problem. The multipath propagation represents a phenomenon that a plurality of transmission signals arriving at various times in delay due to reflection of a radio wave are multiplexed and received at the reception end. In the OFDM/QAM, the symbol includes a guard interval such that an arrival time difference, caused due to the multipath propagation, among a plurality of incoming waves is absorbed so as to maintain the orthogonal characteristic among a plurality of carriers. The guard interval enables a signal to be received at the reception end even in a multipath propagation environment without causing an interference between symbols and an interference between carriers. Such a resistance to the multipath propagation is utilized in the field of a radio communication such as digital terrestrial television broadcasting and wireless LAN.

On the other hand, in the wire communication such as xDSL and power line communication, an interfering signal received from another system and/or device often causes a problem. In many cases, such an interfering signal is a narrowband signal. In the OFDM/QAM, modulated waves transmitted on the respective carriers are received by narrow-passband filters, respectively. Therefore, in the OFDM/QAM, a carrier influenced by the interfering signal can be limited. Further, in the OFDM/QAM, an amount of information of data transmitted on a carrier influenced by the interfering signal is reduced, or the carrier is not used, thereby enabling improvement of the resistance to the interfering signal. In the field of the wire communication such as the xDSL and power line communication, such a resistance to the narrowband interfering signal is utilized.

However, the guard interval for the OFDM/QAM is used only for absorbing the influence of the multipath, and is not used for transmitting effective information. Therefore, as described in Patent Document 1, the OFDM/QAM has a problem that an efficiency with which a spectrum is used is low, and an energy loss is large.

The OFDM/QAM has another problem that, when a delay time caused by the multipath propagation is longer than the guard interval of an incoming wave, transmission quality is abruptly deteriorated. The OFDM/QAM has still another problem that a passband of a filter for receiving a modulated wave is not sufficiently narrow, and an effect of limiting a carrier influenced by a narrowband interfering signal is insufficient.

As described in Patent Document 1, an OFDM/OQAM (Offset Quadrature Amplitude Modulation) multicarrier modulation is known as another multicarrier modulation for solving the aforementioned problems. In the following description, the OFDM/OQAM multicarrier modulation is simply referred to as an OFDM/OQAM.

(As to OFDM/OQAM)

The principle of the OFDM/OQAM is described in Patent Document 1, and Non-Patent Document 2.

The OFDM/OQAM is a multicarrier modulation for individually subjecting a plurality of carries having different frequencies from each other to amplitude modulation at every symbol transmission cycle, and multiplexing the modulated carriers. When $T_s$ represents a time interval of a symbol, a plurality of the symbols being continuous in the time direction, and $f_s$ represents a frequency interval between carriers adjacent to each other in the frequency direction, a general expression representing a transmission signal for the OFDM/OQAM can be represented by (Equation 3).

$$s(t) = \text{Re}\left[\sum_m \sum_k d_{m,k} g(t - mT_s) e^{j2\pi(f_c + kf_s)t + j\phi_{m,k}}\right] \quad \text{[Equation 3]}$$

In (Equation 3), m represents a symbol number, k represents a carrier number, $f_c$ represents a reference frequency of a carrier, and t represents a time. $d_{m,k}$ represents an amplitude value indicating transmission data transmitted on the k-th carrier in the m-th symbol. $g(t-mT_s)$ represents a window function for the m-th symbol, which is obtained by time-shifting a window function g(t) to the m-th symbol. $\Phi_{m,k}$ represents a modulation phase represented by (Equation 4). In the OFDM/OQAM, the modulation is performed such that a phase is different by π/2 radians between symbols adjacent to each other in the time direction, and between carriers adjacent to each other in the frequency direction.

$$\phi_{m,k} = \begin{cases} \pi/2, & (m+k) \text{ odd} \\ 0, & (m+k) \text{ even} \end{cases} \quad \text{[Equation 4]}$$

In the OFDM/OQAM, a relationship between the time interval $T_s$ of each of the plurality of symbols which are continuous in the time direction and the frequency interval $f_s$ between carries adjacent to each other in the frequency direction satisfies $T_s=1/(2f_s)$.

Accordingly, when the carrier frequency interval $f_s$ is set so as to be the same between in the OFDM/OQAM and in the OFDM/QAM for making a comparison, it is notable that, in the OFDM/OQAM, phase axes orthogonal to each other at half (but not exactly half since a symbol includes a guard interval in the OFDM/QAM) the symbol transmission cycle for the OFDM/QAM are alternately subjected to the amplitude modulation. Anything which has the characteristic of the OFDM/OQAM is handed as the OFDM/OQAM, and the present invention is applied thereto. For example, the time-limited orthogonal multicarrier modulation described in Non-Patent Document 3, the DWMT (Discrete Wavelet Multitone) described in Non-Patent Document 4, and the OFDM/MSK and the OFDM/IOTA described in Patent Document 1 are all regarded as being the same in type as OFDM/OQAM, and are generically referred to as the OFDM/OQAM in the following description.

On the other hand, in a system to which the OFDM/QAM is applied, used is a frame format including a reference signal called a pilot signal which is known to both the transmission and the reception end, so as to estimate transmission characteristic of a transmission channel, and a frequency error and/or a phase error between the transmission end and the reception end.

For example, DVB-T (ETS300-744) which is a standard of digital terrestrial television broadcasting in Europe uses a frame format as shown in FIG. 9. FIG. 9 shows a clipped part of a frame format represented on a time-frequency coordinate plane. In FIG. 9, the abscissa axis represents symbols located in the time direction, and the ordinate axis represents carriers located in the frequency direction. A number on the abscissa axis represents a symbol number in the time direction whereas a number on the ordinate axis represents a carrier number in the frequency direction. A mark ○ represents a pilot signal called a scattered pilot in the DVB-T, and a mark X represents a data transmission signal. As shown in FIG. 9, the pilot signal is located every 12 carriers in the frequency direction. Further, the pilot signal is located so as to be shifted three carriers in the frequency direction for every symbol proceeding in the time direction. Since the pilot signal is shifted three carriers for every symbol, one cycle of a location pattern of the pilot signals is a four-symbol period. The pilot signal is a signal obtained through modulation performed by using a modulation vector known to both the transmission end and the reception end, and is a signal obtained through modulation performed by using a modulation vector which is predetermined in accordance with the number of the located carrier. A transmission signal transmitted from the transmission end is received as a reception signal at the reception end through a transmission channel. The reception signal received at the reception end has an amplitude and a phase which are different from those of the transmission signal transmitted from the transmission end, depending on the transmission characteristic of the transmission channel. When the reception end observes that the pilot signal is included in the reception signal, the reception end can estimate the transmission characteristic of the transmission channel. Further, the transmission characteristic of the transmission channel, which is estimated based on the pilot signal, is two-dimensionally interpolated in the time direction and the frequency direction so as to estimate the transmission characteristic of the transmission channel for the data transmission signal. The reception end is allowed to correctly demodulate the transmitted data by correcting an amplitude and a phase of the reception signal based on the estimated transmission characteristic of the transmission channel.

In another example, a communication frame of IEEE802.11a which is a standard of a wireless LAN uses a frame format illustrated in FIG. 10. FIG. 10 shows one packet frame represented on a time-frequency coordinate plane. In FIG. 10, the abscissa axis represents symbols located in the time direction, and the ordinate axis represents carriers located in the frequency direction. A number on the abscissa axis represents a symbol number in the time direction whereas a number on the ordinate axis represents a carrier number in the frequency direction. A mark ○ represents a reference signal including a pilot signal, and a mark X represents a transmission parameter signal or a data transmission signal for transmitting data. The reference signals each including the pilot signal are modulated by using modulation vectors, respectively, known to the reception end. In FIG. 10, signals transmitted in the first symbol and the second symbol, respectively, are called short training sequence, and are used mainly for automatic gain control (AGC), automatic frequency control (AFC), and detection of packets, at the reception end. Signals transmitted in the third symbol and the fourth symbol, respectively, are called long training sequence, and are used mainly for symbol synchronization, and estimation of the transmission characteristic of the transmission channel at the reception end. The fifth symbol is used mainly for transmitting transmission parameter information called SIGNAL. The sixth to the m-th symbols are symbols used mainly for transmitting data. The pilot signals included in the fifth to the m-th symbols, respectively, are used mainly for estimating, at the reception end, phase shifting caused by carrier frequency shifting and sampling frequency shifting from those of the transmission end. The reception end is allowed to correctly demodulate transmitted data by correcting the received signal based on the estimated transmission characteristic of the transmission channel and phase shifting.

However, as described in Patent Document 2, it is difficult to apply, to the OFDM/OQAM, a frame format similar to that used for the OFDM/QAM, that is, a frame format in which the pilot signals are located. The reason will be described with reference to FIG. 11.

FIG. 11 is a diagram illustrating a part of a frame format represented on a time-frequency coordinate plane. In FIG. 11, the abscissa axis represents symbols located in the time direction, and the ordinate axis represents carriers located in the frequency direction. A number on the abscissa axis represents a symbol number in the time direction where as a number on the ordinate axis represents a carrier number in the frequency direction. A pilot signal 10 is located on the k-th carrier in the m-th symbol and transmitted. Data transmission signals 11 to 18 are located in the vicinity of the pilot signal 10 and transmitted. The data transmission signals 11 to 13 are located on the (k−1)th to the (k+1)th carriers, respectively, in the (m−1)th symbol, and transmitted. The data transmission signals 14 and 15 are located on the (k−1)th carrier and (k+1)th carrier, respectively, in the m-th symbol, and transmitted. The data transmission signals 16 to 18 are located on the (k−1)th to the (k+1)th carriers, respectively, in the (m+1)th symbol, and transmitted.

The pilot signal 10 is obtained through modulation performed by using an amplitude value $d_{m,k}$ known to the transmission end and the reception end. The data transmission signals 11 to 18 are obtained through modulation performed by using amplitude values $d_{m-1,k-1}$, $d_{m-1,k}$, $d_{m-1,k+1}$, $d_{m,k-1}$, $d_{m,k+1}$, $d_{m+1,k-1}$, $d_{m+1,k}$, and $d_{m+1,k+1}$, respectively, based on the transmission data.

The pilot signal 10 received at the reception end in an ideal state is represented by (Equation 5). The "ideal state" described above represents a state where an amplitude change and a phase shifting do not occur through transmission, or disturbance such as a noise and an interference does not occur, and a transmission signal transmitted from the transmission end is received as it is as a reception signal at the reception end.

$$r_{m,k} = d_{m,k} + j\begin{Bmatrix} \alpha_{m-1,k-1}d_{m-1,k-1} + \alpha_{m-1,k}d_{m-1,k} + \\ \alpha_{m-1,k+1}d_{m-1,k+1} + \alpha_{m,k-1}d_{m,k-1} + \\ \alpha_{m,k+1}d_{m,k+1} + \alpha_{m+1,k-1}d_{m+1,k-1} + \\ \alpha_{m+1,k}d_{m+1,k} + \alpha_{m+1,k+1}d_{m+1,k+1} \end{Bmatrix}$$ [Equation 5]

In (Equation 5), $r_{m,k}$ represents a complex vector representing the pilot signal 10 received in the ideal state. $\alpha_{m-1,k-1}$, $\alpha_{m-1,k}$, $\alpha_{m-1,k+1}$, $\alpha a_{m,k+1}$, $\alpha_{m,k+1}$, $\alpha_{m+1,k-1}$, $\alpha_{m+1,k}$, and $\alpha_{m+1,k+1}$ represent coefficients of specific interferences, to the pilot signal 10, caused by the data transmission signals 11 to 18, respectively. As represented by (Equation 5), the pilot signal 10 $\{r_{m,k}\}$ received in the ideal state at the reception end includes, in the real number term (in-phase), an amplitude value $d_{m,k}$ of the pilot signal 10 obtained through modulation at the transmission end, and includes, in the imaginary number term (quadrature phase), the specific interferences caused by the data transmission signals 11 to 18 which are located in the vicinity of the pilot signal 10, and transmitted.

Next, communication performed through a transmission channel will be described. When $H_{m,k}$ represents transmission characteristic of the transmission channel for the k-th carrier in the m-th symbol corresponding to the pilot signal 10, the pilot signal 10 $\{r'_{m,k}\}$ received through the transmission channel at the reception end is represented by (Equation 6). Here, the transmission characteristic $H_{m,k}$ is represented as a complex vector.

$$r'_{m,k} = H_{m,k}r_{m,k}$$ [Equation 6]

In order to estimate the transmission characteristic $H_{m,k}$ of the transmission channel by using a pilot signal $r'_{m,k}$ received through the transmission channel at the reception end, the pilot signal $r'_{m,k}$ received through the transmission channel may be divided by the pilot signal $r_{m,k}$ to be received in the ideal state, as represented by (Equation 7).

$$H_{m,k} = r'_{m,k}/r_{m,k}$$ [Equation 7]
$$= \frac{r'_{m,k}}{d_{m,k} + j\begin{Bmatrix} \alpha_{m-1,k-1}d_{m-1,k-1} + \alpha_{m-1,k}d_{m-1,k} + \\ \alpha_{m-1,k+1}d_{m-1,k+1} + \alpha_{m,k-1}d_{m,k-1} + \\ \alpha_{m,k+1}d_{m,k+1} + \alpha_{m+1,k-1}d_{m+1,k-1} + \\ \alpha_{m+1,k}d_{m+1,k} + \alpha_{m+1,k+1}d_{m+1,k+1} \end{Bmatrix}}$$

However, when the data transmission signals 11 to 18 which are obtained through modulation using data unknown to the reception end, are located in the vicinity of the pilot signal 10 and transmitted, the interference component generated in the pilot signal 10 is unknown to the reception end, and the unknown interference component prevents estimation of the transmission characteristic $H_{m,k}$ of the transmission channel.

Therefore, in the conventional multicarrier modulation described in Patent Document 2, a constraint condition is imposed on at least one of the data transmission signals 11 to 18 which are located in the vicinity of the pilot signal 10 and transmitted so as to suppress an interference (specific interference occurring in a quadrature phase component) in the pilot signal 10. Specifically, a constraint condition is imposed on at least one of the amplitude values $d_{m-1,k-1}$, $d_{m-1,k}$, $d_{m-1,k+1}$, $d_{m,k-1}$, $d_{m,k+1}$, $d_{m+1,k-1}$, $d_{m+1,k}$, and $d_{m+1,k+1}$, for modulating the data transmission signals 11 to 18 such that the imaginary number term in (Equation 5) indicates zero.

For example, when the constraint condition is imposed on the amplitude value $d_{m+1,k}$ for modulating the data transmission signal 17 to be transmitted on the k-th carrier in the (m+1)th symbol, the amplitude value $d_{m+1,k}$ is determined so as to satisfy (Equation 8).

$$\begin{Bmatrix} \alpha_{m-1,k-1}d_{m-1,k-1} + \alpha_{m-1,k}d_{m-1,k} + \\ \alpha_{m-1,k+1}d_{m-1,k+1} + \alpha_{m,k-1}d_{m,k-1} + \\ \alpha_{m,k+1}d_{m,k+1} + \alpha_{m+1,k-1}d_{m+1,k-1} + \\ \alpha_{m+1,k}d_{m+1,k} + \alpha_{m+1,k+1}d_{m+1,k+1} \end{Bmatrix} = 0$$ [Equation 8]

As described above, when suppressed is an interference (specific interference occurring in the quadrature phase component) to the pilot signal 10 from the data transmission signals 11 to 18 which are located in the vicinity of the pilot signal 10 and transmitted, an imaginary number area of the pilot signal 10 received at the reception end is known, so that the estimation of the transmission characteristic $H_{m,k}$ of the transmission channel is easily performed at the reception end.

Patent Document 1: Japanese Translation of PCT International Application No. 11-510653 (Publication No.: WO96/35278)

Patent Document 2: Japanese Translation of PCT International Application No. 2004-509562 (Publication No.: WO2002/025884)

Non-Patent Document 1: S. B. Weinstein and Paul M. Ebert, "Data Transmission by Frequency-Division Multiplexing Using the Discrete Fourier Transform", IEEE Transaction on Communications, vol. COM-19, pp. 628-634, October 1971.

Non-Patent Document 2: Burton R. Saltzberg, "Performance of an Efficient Parallel Data Transmission System", IEEE Transaction on Communications, vol. COM-15, pp. 805-811, December 1967.

Non-Patent Document 3: R. Li and G. Stette, "Time-Limited Orthogonal Multicarrier Modulation Schemes", IEEE Transaction on Communications, vol. 43, pp, 1269-1272, February/March/April 1995.

Non-Patent Document 4: M. A. Tzannes, M. C. Tzannes, J. Proakis and P. N. Heller, "DMT Systems, DWMT Systems and Digital Filter Banks", IEEE International Conference on Communications, pp. 311-315, May. 1994

DISCLOSURE OF THE INVENTION

Problems to be Solved by the Invention

However, the conventional method for imposing the constraint condition as described above has a problem that it is necessary to perform a calculation so as to satisfy (Equation 8) at the transmission end, thereby complicating processing of the transmission end. In the above description, although only interference from modulated waves which are adjacent in the time direction and in the frequency direction is taken into consideration, an interference from a modulated wave which is located at a farther location and transmitted actually occurs. Therefore, the calculation of (Equation 8) for suppressing an actual influence of the specific interference is increasingly complicated. Further, when an interference to the pilot signal from the data transmission signals other than the data transmission signal on which the constraint condition is imposed is large, there is a problem that an amplitude of the data transmission signal on which the constraint condition is imposed is increased in order to eliminate the interference, thereby causing increase of transmission power.

The present invention is made to solve the aforementioned problems of the conventional art, and an object thereof is to provide a multicarrier modulation scheme capable of simplifying processing of the transmission end, and reducing transmission power, as well as a transmission apparatus and a reception apparatus using the scheme.

Solution to the Problems

A multicarrier modulation scheme according to the present invention is a multicarrier modulation scheme in which $v\tau=\frac{1}{2}$ is satisfied when $\tau$ represents a symbol transmission interval, and $v$ represents frequency intervals of a plurality of carriers, in which a multicarrier modulated signal generated by performing a modulation in the multicarrier modulation scheme includes a phase reference pilot signal, and the phase reference pilot signal is a null signal (a signal obtained through a modulation performed by using an amplitude value which is zero).

Therefore, it is possible to accurately estimate a phase component of transmission characteristic of a transmission channel by performing a simplified calculation at a reception end without calculating an amount of interference to a pilot signal from a data transmission signal and performing a calculation for canceling the amount of interference at a transmission end. Further, in the multicarrier modulation scheme according to the present invention, it is possible to estimate, at the reception end, the phase component of the transmission characteristic of the transmission channel, a frequency error between the transmission end and the reception end, a phase error there between, and the like by detecting a phase difference of the phase reference pilot signal, and correct the phase component, the frequency, the phase, and the like. Further, in the multicarrier modulation scheme of the present invention, it is possible to reduce transmission power for the phase reference pilot signal.

According to the present invention, preferably, a plurality of the phase reference pilot signals are located in a plurality of symbols, respectively, which are continuous in a time direction on a predetermined carrier.

A multicarrier modulation scheme according to the present invention is a multicarrier modulation scheme in which $v\tau=\frac{1}{2}$ is satisfied when $\tau$ represents a symbol transmission interval, and $v$ represents frequency intervals of a plurality of carriers, in which a multicarrier modulated signal generated by performing a modulation in the multicarrier modulation scheme includes a phase reference pilot signal and an amplitude reference pilot signal, and the phase reference pilot signal is a null signal (a signal obtained through a modulation performed by using an amplitude value which is zero), and the amplitude reference pilot signal is a signal obtained through a modulation performed by using an amplitude value known to a reception end.

According to the present invention, the phase reference pilot signal (that is, a null signal) of which a modulation amplitude is suppressed to zero and the amplitude reference pilot signal obtained through modulation performed by using a known amplitude having a value other than zero are inserted at the transmission end. Thus, it is possible to accurately estimate transmission characteristic of a transmission channel by performing a simplified calculation at the reception end without calculating an amount of interference to a pilot signal from a data transmission signal and performing a calculation for canceling the amount of interference at the transmission end. Further, in the multicarrier modulation scheme according to the present invention, it is possible to estimate, at the reception end, the transmission characteristic of the transmission channel, a frequency error between the transmission end and the reception end, a phase error therebetween, and the like by detecting a phase difference of the phase reference pilot signal, and an amplitude difference of the amplitude reference pilot signal, and correct the transmission characteristic, the frequency, the phase, and the like. Further, in the multicarrier modulation scheme of the present invention, it is possible to reduce transmission power for the phase reference pilot signal.

According to the present invention, preferably, the phase reference pilot signal and the amplitude reference pilot signal are located alternately every other symbol over a plurality of symbols which are continuous in a time direction on a predetermined carrier.

According to the present invention, preferably, the phase reference pilot signal and the amplitude reference pilot signal are located alternately every other carrier over a plurality of carriers which are continuous in a frequency direction in a predetermined symbol.

According to the present invention, preferably, the phase reference pilot signal and the amplitude reference pilot signal are located alternately every other carrier in a frequency direction, and are located alternately every other symbol in a time direction.

A transmission apparatus according to the present invention generates the multicarrier modulated signal in the multicarrier modulation scheme of the present invention, and transmits the multicarrier modulated signal.

A transmission apparatus according t to the present invention is a transmission apparatus for generating a multicarrier modulated signal in a multicarrier modulation scheme in which $v\tau=\frac{1}{2}$ is satisfied when $\tau$ represents a symbol transmission interval, and $v$ represents frequency intervals of a plurality of carriers, and transmitting the multicarrier modulated signal, and the transmission apparatus comprises:

frame generation means for receiving transmission data, and generating a frame signal including an amplitude value for generating a data transmission signal based on the transmission data, and an amplitude value of zero for generating a phase reference pilot signal; and multicarrier modulation means for generating the multicarrier modulated signal, using amplitude value information included in the frame signal, in the multicarrier modulation scheme.

A transmission apparatus according to the present invention is a transmission apparatus for generating a multicarrier modulated signal in a multicarrier modulation scheme in which $v\tau=\frac{1}{2}$ is satisfied when $\tau$ represents a symbol transmission interval, and $v$ represents frequency intervals of a plurality of carriers, and transmitting the multicarrier modulated signal, and the transmission apparatus comprises:

frame generation means for receiving transmission data, and generating a frame signal including an amplitude value for generating a data transmission signal based on the transmission data, an amplitude value of zero for generating a phase reference pilot signal, and an amplitude value, known to a reception end, for generating an amplitude reference pilot signal; and multicarrier modulation means for generating the multicarrier modulated signal, using amplitude value information included in the frame signal, in the multicarrier modulation scheme.

A reception apparatus according to the present invention receives the multicarrier modulated signal generated in the multicarrier modulation scheme of the present invention, and estimates a shift of a phase of the multicarrier modulated signal by using the phase reference pilot signal included in the multicarrier modulated signal, so as to compensate the phase.

A reception apparatus according to the present invention, receives the multicarrier modulated signal generated in the multicarrier modulation scheme of the present invention, estimates a shift of a phase of the multicarrier modulated signal by using the phase reference pilot signal included in the multicarrier modulated signal, so as to compensate the phase, and estimates a difference of an amplitude of the multicarrier modulated signal by using the amplitude reference pilot signal included in the multicarrier modulated signal, so as to compensate the amplitude.

A reception apparatus according to the present invention is a reception apparatus for receiving and demodulating a multicarrier modulated signal generated in a multicarrier modulation scheme in which $v\tau=\frac{1}{2}$ is satisfied when $\tau$ represents a symbol transmission interval, and $v$ represents frequency intervals of a plurality of carriers, in which the multicarrier modulated signal includes a phase reference pilot signal which is a null signal (a signal obtained through a modulation performed by using an amplitude value which is zero), and the reception apparatus comprises multicarrier demodulation means for demodulating the received multicarrier modulated signal so as to generate a demodulation vector, and outputting the demodulation vector, and equalization means for receiving the demodulation vector, and estimating a shift of a phase of the demodulation vector in accordance with the phase reference pilot signal, so as to compensate the phase.

According to the present invention, the equalization means preferably includes phase estimation means for extracting the phase reference pilot signal included in the demodulation vector, and estimating the shift of the phase of the demodulation vector, and phase compensation means for compensating the phase of the demodulation vector in accordance with the shift of the phase estimated by the phase estimation means.

A reception apparatus according to the present invention is a reception apparatus for receiving and demodulating a multicarrier modulated signal obtained through a modulation performed in a multicarrier modulation scheme in which $v\tau=\frac{1}{2}$ is satisfied when $\tau$ represents a symbol transmission interval, and $v$ represents frequency intervals of a plurality of carriers, in which the multicarrier modulated signal includes a phase reference pilot signal which is a null signal (a signal obtained through a modulation performed by using an amplitude value which is zero), and an amplitude reference pilot signal obtained through a modulation performed by using an amplitude known to a reception end, and the reception apparatus comprises multicarrier demodulation means for demodulating the received multicarrier modulated signal so as to generate a demodulation vector, and outputting the demodulation vector, and equalization means for receiving the demodulation vector, and estimating a shift of a phase of the demodulation vector by using the phase reference pilot signal so as to compensate the phase, and estimating a difference of an amplitude of the demodulation vector by using the amplitude reference pilot signal so as to compensate the amplitude.

According to the present invention, the equalization means preferably includes:

phase estimation means for extracting the phase reference pilot signal included in the demodulation vector, and estimating the shift of the phase of the demodulation vector;

phase compensation means for compensating the phase of the demodulation vector in accordance with the shift of the phase estimated by the phase estimation means;

amplitude estimation means for extracting the amplitude reference pilot signal included in the demodulation vector which is phase-compensated and is outputted by the phase compensation means, and estimating a difference of an amplitude of the phase-compensated demodulation vector; and phase compensation means for compensating, in accordance with the difference of the amplitude estimated by the amplitude estimation means, the amplitude of the demodulation vector which is phase-compensated and is outputted by the phase compensation means.

According to the present invention,
the equalization means preferably includes:
phase estimation means for extracting the phase reference pilot signal included in the demodulation vector, and estimating the shift of the phase of the demodulation vector;
phase compensation means for compensating the phase of the demodulation vector in accordance with the shift of the phase estimated by the phase estimation means;
amplitude estimation means for extracting the amplitude reference pilot signal included in the demodulation vector which is phase-compensated and is outputted by the phase compensation means, and estimating a difference of an amplitude of the phase-compensated demodulation vector; and
compensation means for compensating, in accordance with the shift of the phase estimated by the phase estimation means and the difference of the amplitude estimated by the amplitude estimation means, the phase and an amplitude of the demodulation vector.

Effect of the Invention

In the multicarrier modulation according to the present invention, it is possible to insert a predetermined known pilot signal without calculating an interference to a pilot signal from a data transmission signal at the transmission end. Further, the modulation amplitude of the phase reference pilot signal is suppressed to zero, and therefore the phase reference pilot signal is not transmitted from the transmission end in practice, so that an effect of reducing transmission power is exerted.

BRIEF DESCRIPTION OF THE DRAWINGS

FIG. 3 is a block diagram illustrating an exemplary configuration of equalization means using the multicarrier modulation of the present invention.

FIG. 4 is a block diagram illustrating another exemplary configuration of equation means using the multicarrier modulation of the present invention.

FIG. 5 is a diagram illustrating a frame format for a multicarrier modulation according to an embodiment 2 of the present invention.

FIG. 6 is a diagram illustrating a frame format for a multicarrier modulation according to an embodiment 3 of the present invention.

FIG. 7 is a diagram illustrating a frame format for a multicarrier modulation according to an embodiment 4 of the present invention.

FIG. 8 is a diagram illustrating a frame format for a multicarrier modulation according to an embodiment 5 of the present invention.

FIG. 9 is a diagram illustrating a frame format for a conventional digital terrestrial television broadcasting standard.

FIG. 10 is a diagram illustrating a frame format for a conventional wireless LAN standard.

Figure 1:
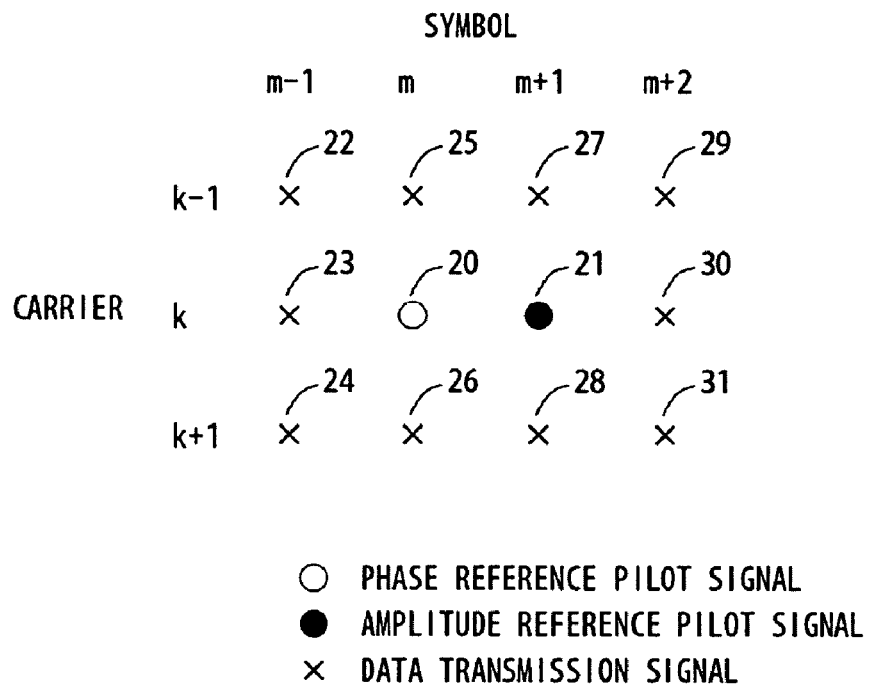
FIG. 1 is a diagram illustrating a frame format for a multicarrier modulation according to an embodiment 1 of the present invention.

DESCRIPTION OF THE REFERENCE CHARACTERS 10 pilot signal
11 to 18 data transmission signal
20 phase reference pilot signal
21 amplitude reference pilot signal
22 to 31 data transmission signal
110 transmission end
111 frame generation means
112 multicarrier modulation means
120 transmission channel
130 reception end
131 multicarrier demodulation means
132 equalization means
141 phase estimation means
142 phase compensation means
143 amplitude estimation means
144 amplitude compensation means
151 phase estimation means
152 phase compensation means
153 amplitude estimation means
154 compensation means

BEST MODE FOR CARRYING OUT THE INVENTION

Hereinafter, embodiments of the present invention will be described with reference to the drawings.

Embodiment 1

FIG. 1 is a diagram illustrating a clipped part of a frame format, represented on a time-frequency coordinate plane, for a multicarrier modulation scheme according to an embodiment 1 of the present invention. In FIG. 1, the abscissa axis represents symbols located in the time direction, and the ordinate axis represents carriers located in the frequency direction. A number on the abscissa axis represents a symbol number in the time direction whereas a number on the ordinate axis represents a carrier number in the frequency direction. A phase reference pilot signal 20 is located on the k-th carrier in the m-th symbol, and transmitted. An amplitude reference pilot signal 21 is located on the k-th carrier in the (m+1)th symbol, and transmitted. Data transmission signals 22 to 31 are located in the vicinity of the phase reference pilot signal 20 and the amplitude reference pilot signal 21, and transmitted. The data transmission signals 22 to 24 are located on the (k−1)th to the (k+1)th carriers, respectively, in the (m−1)th symbol, and transmitted. The data transmission signals 25 and 26 are located on the (k−1)th and the (k+1)th carriers, respectively, in the m-th symbol, and transmitted. The data transmission signals 27 and 28 are located on the (k−1)th and the (k+1)th carriers, respectively, in the (m+1)th symbol, and transmitted. The data transmission signals 29 to 31 are located on the (k−1)th to the (k+1)th carriers, respectively, in the (m+2)th symbol, and transmitted.

In the present embodiment, the OFDM/OQAM multicarrier modulation scheme is used. This is the same for other embodiments described below. The OFDM/OQAM is a multicarrier modulation for individually subjecting a plurality of carries having different frequencies from each other to amplitude modulation at every symbol transmission cycle, and multiplexing the modulated carriers. When $T_s$ represents a time interval of a symbol, a plurality of the symbols being continuous in the time direction, and $f_s$ represents a frequency interval between carriers adjacent to each other in the frequency direction, a general expression representing a transmission signal for the OFDM/OQAM may be represented by (Equation 9).

$$s(t) = \text{Re}\left[\sum_m \sum_k d_{m,k} g(t - mT_s) e^{j2\pi(f_c + kf_s)t + j\phi_{m,k}}\right] \quad \text{[Equation 9]}$$

In (Equation 9), m represents a symbol number, k represents a carrier number, $f_c$ represents a reference frequency of a carrier, and t represents a time. $d_{m,k}$ represents an amplitude value representing transmission data transmitted on the k-th carrier in the m-th symbol. $g(t-mT_s)$ represents a window function for the m-th symbol, which is obtained by time-shifting a window function g(t) to the m-th symbol. $\Phi_{m,k}$ represents a modulation phase represented by (Equation 10). In the OFDM/OQAM, the modulation is performed such that a phase is different by $\pi/2$ radians between symbols adjacent to each other in the time direction, and between carriers adjacent to each other in the frequency direction.

$$\phi_{m,k} = \begin{cases} \pi/2, & (m+k) \text{ odd} \\ 0, & (m+k) \text{ even} \end{cases} \quad \text{[Equation 10]}$$

In the OFDM/OQAM, a relationship between the time interval $T_s$ of each of the plurality of the symbols which are continuous in the time direction and the frequency interval $f_s$ between carries adjacent to each other in the frequency direction satisfies $f_s T_s = \frac{1}{2}$.

The phase reference pilot signal 20 is a signal obtained through modulation performed at the transmission end by using the amplitude value $d_{m,k}$ which is zero. That is, the phase reference pilot signal 20 is a null signal. Further, the reception end knows that the phase reference pilot signal 20 is a null signal.

The amplitude reference pilot signal 21 is a signal obtained through modulation using the amplitude value $d_{m+1,k}$ which is known to the reception end. The data transmission signals 22 to 31 are signals obtained through modulation using the amplitude values $d_{m-1,k-1}$, $d_{m-1,k}$, $d_{m-1,k+1}$, $d_{m,k-1}$, $d_{m,k+1}$, $d_{m+1,k-1}$, $d_{n+1,k+1}$, $d_{m+2,k-1}$, $d_{m+2,k}$ and $d_{m+2,k+1}$, respectively, based on the transmission data.

The phase reference pilot signal 20 received at the reception end in the ideal state is represented by (Equation 11).

$$r_{m,k} = d_{m,k} + j\begin{cases} \alpha_{m-1,k-1} d_{m-1,k-1} + \alpha_{m-1,k} d_{m-1,k} + \\ \alpha_{m-1,k+1} d_{m-1,k+1} + \alpha_{m,k-1} d_{m,k-1} + \\ \alpha_{m,k+1} d_{m,k+1} + \alpha_{m+1,k-1} d_{m+1,k-1} + \\ \alpha_{m+1,k} d_{m+1,k} + \alpha_{m+1,k+1} d_{m+1,k+1} \end{cases} \quad \text{[Equation 11]}$$

In (Equation 11), $r_{m,k}$ represents a complex vector representing the phase reference pilot signal 20 received in the ideal state. $\alpha_{m+1,k}$ represents a coefficient of an interference to a quadrature phase axis of the phase reference pilot signal 20 from the amplitude reference pilot signal 21. Here, the "quadrature phase axis" represents a phase axis orthogonal to (that is, different by $\pi/2$ radians from) a phase axis on which each carrier in each symbol is subjected to the amplitude modulation at the transmission end. Further, $\alpha_{m-1,k-1}$, $\alpha_{m-1,k}$, $\alpha_{m-1,k+1}$, $\alpha_{m,k-1}$, $\alpha_{m,k+1}$, $\alpha_{m+1,k-1}$, and $\alpha_{m+1,k+1}$ represent coefficients representing magnitudes of interferences to the quadrature phase axis of the phase reference pilot signal 20 from the data transmission signals 22 to 28, respectively. As represented by (Equation 11), the phase reference pilot signal 20 received at the reception end in the ideal state includes, only in the imaginary number term, an interference component from each of the amplitude reference pilot signal 21 and the data transmission signals 22 to 28 located in the vicinity thereof and transmitted. Therefore, the phase reference pilot signal 20 received at the reception end in the ideal state includes only the imaginary number component. Accordingly, a phase of the phase reference pilot signal 20 $\{r_{m,k}\}$ is $\pm \pi/2$ radians. In (Equation 11), although the interference to the quadrature phase axis of the phase reference pilot signal 20 is based on only modulated signals located adjacent thereto and transmitted, an interference from a modulated signal located at a farther location actually occurs. The interference from a modulated signal located at a location farther than the location adjacent to the phase reference pilot signal 20 also occurs in the quadrature phase axis of the phase reference pilot signal 20. Thus, (Equation 11) covers a general extent to which the interference occurs.

A case where communication is performed through a transmission channel will be described. The phase reference pilot signal 20 is transmitted on the k-th carrier in the m-th symbol. When $H_{m,k}$ represents transmission characteristic of a transmission channel for the phase reference pilot signal 20, the phase reference pilot signal 20 $\{r'_{m,k}\}$ received at the reception end through the transmission channel is represented by (Equation 12). The transmission characteristic $H_{m,k}$ is represented as a complex vector.

$$r_{m,k}' = H_{m,k} r_{m,k} \quad \text{[Equation 12]}$$

The phase component $\Phi_{m,k}$ of the transmission characteristic $H_{m,k}$ of the transmission channel can be estimated based on the phase reference pilot signal 20 $\{r'_{m,k}\}$ received at the reception end through the transmission channel. The phase component $\Phi_{m,k}$ of the transmission characteristic of the transmission channel can be estimated by subtracting, from a phase $\angle r'_{m,k}$ of the phase reference pilot signal 20 received at the reception end through the transmission channel, $+\pi/2$ radians or $-\pi/2$ radians which corresponds to a phase $\phi r_{m,k}$ of the phase reference pilot signal 20 received in the idealistic state, as represented in (Equation 13).

$$\Phi_{m,k} = \begin{cases} \angle r'_{m,k} - \pi/2 \\ \text{or} \\ \angle r'_{m,k} + \pi/2 \end{cases} \quad \text{[Equation 13]}$$

Although the estimated phase component $\Phi_{m,k}$ of the transmission characteristic of the transmission channel includes a phase uncertainty of $\pi$ radians as to the phase $\phi r_{m,k}$ of the phase reference pilot signal 20, the phase uncertainty is removed in the process step described below. The "phase uncertainty of $\pi$ radians" described above occurs because whether the phase reference pilot signal 20 received in the ideal state represents $+\pi/2$ radians or $-\pi/2$ radians is unknown at this point, and it is unclear whether the phase is $+\pi/2$ radians or $-\pi/2$ radians.

The amplitude reference pilot signal 21 received at the reception end in the idealistic state is represented by (Equation 14).

$$r_{m+1,k} = d_{m+1,k} + j \begin{Bmatrix} \alpha_{m,k-1} d_{m,k-1} + \alpha_{m,k+1} d_{m,k+1} + \\ \alpha_{m+1,k-1} d_{m+1,k-1} + \\ \alpha_{m+1,k+1} d_{m+1,k+1} + \\ \alpha_{m+2,k-1} d_{m+2,k-1} + \\ \alpha_{m+2,k} d_{m+2,k} + \\ \alpha_{m+2,k+1} d_{m+2,k+1} \end{Bmatrix}$$ [Equation 14]

In (Equation 14), $r_{m+1,k}$ represents a complex vector representing the amplitude reference pilot signal 21 received in the ideal state. $\alpha_{m,k-1}$, $\alpha_{m,k+1}$, $\alpha_{m+1,k-1}$, $\alpha_{m+1,k+1}$, $\alpha_{m+2,k-1}$, $\alpha_{m+2,k}$ and $\alpha_{m+2,k+1}$ represent coefficients representing magnitudes of interferences from the data transmission signals 25 to 31, respectively, to the quadrature phase axis of the amplitude reference pilot signal 21. As represented by (Equation 14), the amplitude reference pilot signal 20 received at the reception end in the ideal state includes, in the real number term, an amplitude value $d_{m+1,k}$ of the amplitude reference pilot signal 21 obtained through the modification at the transmission end, and includes, in the imaginary number term, interference components from the data transmission signals 25 to 31, respectively, located in the vicinity thereof.

A case where communication is performed through a transmission channel will be described. The amplitude reference pilot signal 21 is transmitted on the k-th carrier in the (m+1)th symbol. When $H_{m+1,k}$ represents transmission characteristic of the amplitude reference pilot signal 21, the amplitude reference pilot signal 21 $\{r'_{m+1,k}\}$ received through the transmission channel at the reception end is represented by (Equation 15). Here, the transmission characteristic $H_{m+1,k}$ is represented as a complex vector.

$$r'_{m+1,k} = H_{m+1,k} r_{m+1,k}$$ [Equation 15]

An amplitude component $A_{m+1,k}$ of the transmission characteristic $H_{m+1,k}$ of the transmission channel can be estimated based on the amplitude reference pilot signal 21 $\{r'_{m+1,k}\}$ received at the reception end through the transmission channel. Assuming that a temporal variation in the transmission characteristic of the transmission channel is small, the transmission characteristic $H_{m,k}$ for the k-th carrier in the m-th symbol may be the same as the transmission characteristic $H_{m+1,k}$ for the k-th carrier in the (m+1)th symbol. As represented by (Equation 16), the phase $r'_{m+1,k}$ of the amplitude reference pilot signal 21 received at the reception end through the transmission channel is phase-corrected by using the already-estimated phase component $\Phi_{m,k}$ of the transmission characteristic of the transmission channel, and a real number component of the phase-corrected amplitude reference pilot signal 21 is divided by a known amplitude value of the amplitude reference pilot signal 21, that is, by the amplitude value $d_{m+1,k}$ used at the transmission end, thereby enabling estimation of the amplitude component $A_{m+1,k}$ of the transmission characteristic of the transmission channel.

$$A_{m+1,k} = \frac{\text{Re}[r'_{m+1,k} e^{-j\Phi_{m,k}}]}{d_{m+1,k}}$$ [Equation 16]

The transmission characteristics $H_{m,k}$ and $H_{m+1,k}$ of the transmission channel are estimated, as represented by (Equation 17), by using the phase component $\Phi_{m,k}$ and the amplitude component $A_{m+1,k}$, estimated in the aforementioned manner, of the transmission characteristic.

$$H_{m,k} = H_{m+1,k} = A_{m+1,k} e^{j\Phi_{m,k}}$$ [Equation 17]

Even when the estimated phase component $\Phi_{m,k}$ of the transmission characteristic is different from an actual value by $\pi$ radians due to the phase uncertainty, the phase uncertainty is removed. This is because, when the phase component $\Phi_{m,k}$ of the transmission characteristic is estimated at a value different from an actual value by $\pi$ radians, a polarity of the amplitude component $A_{m+1,k}$ of the transmission characteristic, which is estimated in (Equation 16), is reversed, and values of which the polarities are reversed are multiplied with each other in (Equation 17), resulting in each of the polarities of the estimated transmission characteristics $H_{m,k}$ and $H_{m+1,k}$ being the same as a real polarity.

An outline of a communication system using the multicarrier modulation of the present invention will be described with reference to FIG. 2.

Figure 2:
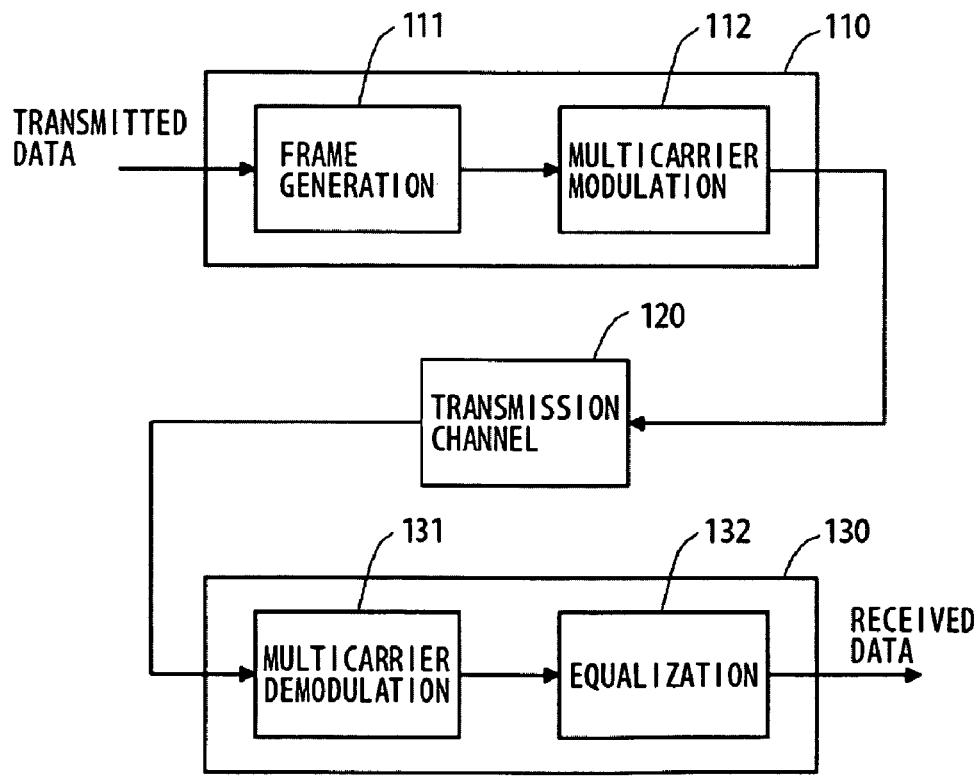
FIG. 2 is a schematic diagram illustrating a communication system using the multicarrier modulation of the present invention.
Figure 11:
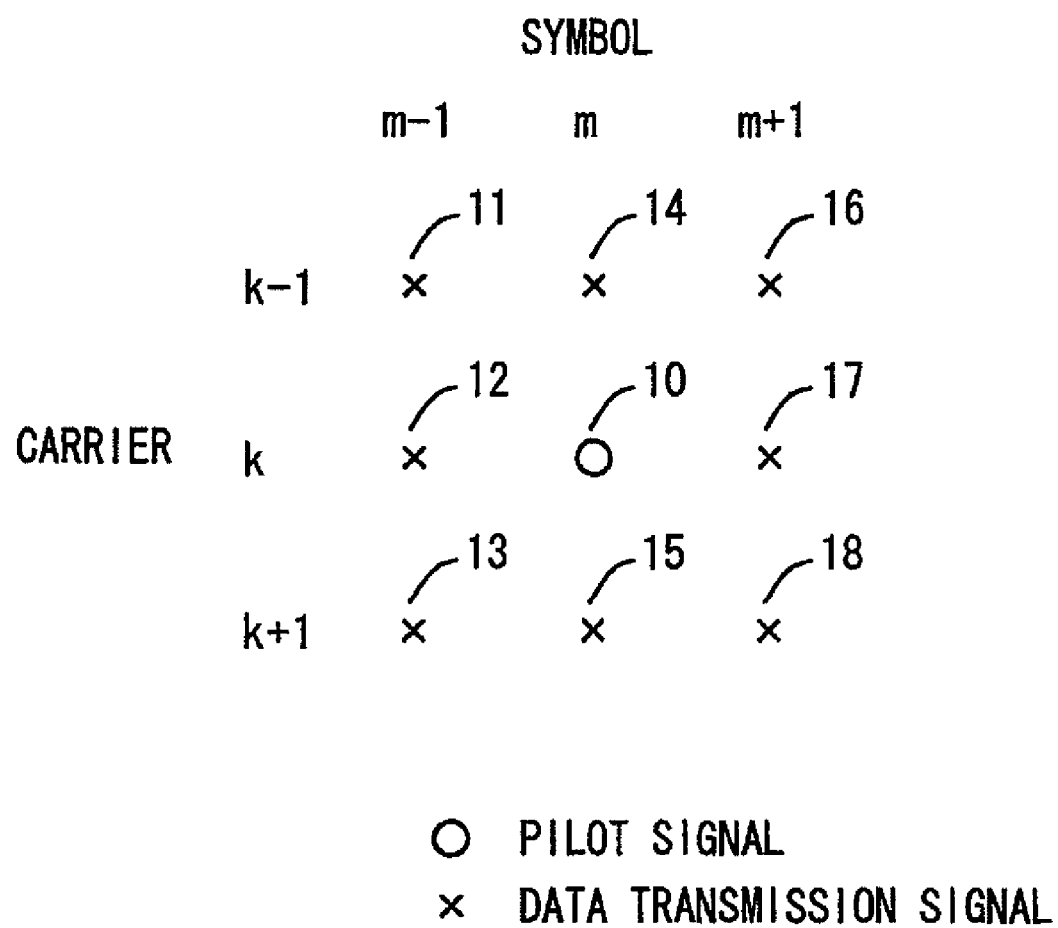
FIG. 11 is a diagram illustrating a frame format for a conventional multicarrier modulation.

As shown in FIG. 2, the communication system includes a transmission end 110 and a reception end 130. A multicarrier modulated signal transmitted from the transmission end 110 is received by the reception end 130 through the transmission channel 120.

The transmission channel 120 is a wired channel or a wireless channel. When the transmission channel 120 is wireless, the transmission end 110 is connected to the transmission channel 120 through an antenna, and the transmission channel 120 is connected to the reception end 130 through an antenna.

The transmission end 110 includes frame generation means 111 and multicarrier modulation means 112. The frame generation means 111 receives transmission data, and generates an amplitude value for modulating a data transmission signal based on the received transmission data, and generates a frame signal including the amplitude value for modulating the data transmission signal, an amplitude value for modulating the phase reference pilot signal, and an amplitude value for modulating the amplitude reference pilot signal. The amplitude value, included in the frame signal, for modulating the phase reference pilot signal is zero, and the amplitude value, included in the frame signal, for modulating the amplitude reference pilot signal is a value known to the reception end. The multicarrier modulation means 112 receives the frame signal generated by the frame generation means 111, and performs the OFDM/OQAM multicarrier modulation based on the amplitude values included in the frame signal so as to generate a multicarrier modulated signal, and outputs the multicarrier modulated signal from the transmission end 110.

The reception end 130 includes multicarrier demodulation means 131 and equalization means 132. The multicarrier demodulation means 131 multicarrier-demodulates the received OFDM/OQAM multicarrier modulated signal so as to output a demodulation vector. The equalization means 132 receives the demodulation vector outputted by the multicarrier demodulation means 131, and estimates and compensates the transmission characteristic of the transmission channel 120 based on the phase reference pilot signal and the amplitude reference pilot signal. The demodulation vector of which the transmission characteristic has been compensated by the equalization means 132 is demodulated and outputted as received data.

The equalization means 132 may be configured as shown in, for example, FIG. 3. As shown in FIG. 3, the equalization means 132 includes phase estimation means 141, phase compensation means 142, amplitude estimation means 143, and amplitude compensation means 144. The phase estimation means 141 extracts the phase reference pilot signal included in the demodulation vector outputted by the multicarrier demodulation means 131, and estimates a phase component of the transmission characteristic of the transmission channel 120 based on the phase reference pilot signal. The phase compensation means 142 compensates a phase of the demodulation vector out putted by the multicarrier demodulation means 131 based on the phase component of the transmission characteristic of the transmission channel 120, which is estimated by the phase estimation means 141. The amplitude estimation means 143 extracts the amplitude reference pilot signal included in the phase-compensated demodulation vector which is outputted by the phase compensation means 142, and estimates an amplitude component of the transmission characteristic of the transmission channel 120, based on the amplitude reference pilot signal. The amplitude compensation means 144 compensates an amplitude of the phase-compensated demodulation vector which is outputted by the phase compensation means 142, based on the amplitude component of the transmission characteristic of the transmission channel 120, which is estimated by the amplitude estimation means 143. The demodulation vector of which the phase and the amplitude have been compensated is demodulated and outputted as received data.

The equalization means 132 may be configured as shown in FIG. 4. As shown in FIG. 4, the equalization means 132 includes phase estimation means 151, phase compensation means 152, amplitude estimation means 153, and compensation means 154. The phase estimation means 151 extracts the phase reference pilot signal included in the demodulation vector outputted by the multicarrier demodulation means 131, and estimates a phase component of the transmission characteristic of the transmission channel 120 based on the phase reference pilot signal. The phase compensation means 152 compensates a phase of the amplitude reference pilot signal included in the demodulation vector outputted by the multicarrier demodulation means 131, based on the phase component of the transmission characteristic of the transmission channel 120, which is estimated by the phase estimation means 151. The amplitude estimation means 153 extracts the amplitude reference pilot signal included in the phase-compensated demodulation vector which is outputted by the phase compensation means 152, and estimates an amplitude component of the transmission characteristic of the transmission channel 120 based on the amplitude reference pilot signal. The compensation means 154 compensates a phase and an amplitude of the demodulation vector outputted by the multicarrier demodulation means 131, based on the phase component and the amplitude component of the transmission characteristic of the transmission channel 120, the phase component and the amplitude component having been estimated by the phase estimation means 151 and the amplitude estimation means 153, respectively. The demodulation vector of which the phase and the amplitude have been compensated are demodulated and outputted as received data.

Although, in the above description for the present embodiment, a frame format including the phase reference pilot signal 20 and the amplitude reference pilot signal 21 is described, the present embodiment is not limited to this example. When only the phase compensation is performed, a frame format including only the phase reference pilot signal 20 may be used.

Further, although, in the above description for the present embodiment, a frame format including the amplitude reference pilot signal 21 in a symbol immediately following that of the phase reference pilot signal 20 in the time direction is described, the present embodiment is not limited to this example. For example, a frame format including the amplitude reference pilot signal 21 in a symbol immediately preceding that of the phase reference pilot signal 20 in the time direction may be used. Further, when change, over the passage of time, of the transmission characteristic of the transmission channel, is small, the phase reference pilot signal 20 and the amplitude reference pilot signal 21 may not be located in symbols, respectively, adjacent to each other. Specifically, one or more data transmission signal may be located between the phase reference pilot signal 20 and the amplitude reference pilot signal 21.

Further, although, in the above description for the present embodiment, a frame format including the amplitude reference pilot signal 21 in a symbol immediately following that of the phase reference pilot signal 20 in the time direction is described, the present embodiment is not limited to this example. A frame format including the amplitude reference pilot signal 21 in a carrier adjacent to that of the phase reference pilot signal 20 in the frequency direction may be used. Further, when a difference in arrival time, caused due to a multipath, among a plurality of incoming waves is shorter than the symbol transmission cycle, and a coherence frequency band is sufficiently wide as compared to a carrier frequency interval, the phase reference pilot signal 20 and the amplitude reference pilot signal 21 may not be located in carriers, respectively, adjacent to each other in the frequency direction. Specifically, one or more data transmission signal may be located between the phase reference pilot signal 20 and the amplitude reference pilot signal 21.

Further, a polarity of the amplitude reference pilot signal 21 of which the amplitude is known to the reception end may be chosen such that an increased specific interference component is generated in the quadrature phase of the phase reference pilot signal 20 at the reception end. Therefore, when the phase component of the transmission characteristic of the transmission channel is estimated at the reception end, based on the phase reference pilot signal 20, an estimation accuracy is improved.

As described above, in the multicarrier modulation scheme of the present invention, the phase reference pilot signal (that is, a null signal) of which a modulation amplitude is suppressed to zero, and the amplitude reference pilot signal obtained through the modulation performed by using a known amplitude having a value other than zero, are inserted at the transmission end. Thus, it is possible to accurately estimate the transmission characteristic of the transmission channel by performing a simplified calculation at the reception end without calculating an amount of interference to a pilot signal from a data transmission signal and performing a calculation for canceling the amount of interference, at the transmission end. Further, in the multicarrier modulation scheme of the present invention, the reception end is allowed to estimate the transmission characteristic of the transmission channel, a frequency error between the transmission end and the reception end, a phase error therebetween, and the like by detecting a phase difference of the phase reference pilot signal therebetween and the amplitude difference of the amplitude reference pilot signal therebetween, so as to correct the transmission characteristic, the frequency, and the phase, and the like. Moreover, in the multicarrier modulation scheme of the present invention, transmission power for the phase reference pilot signal can be reduced.

Embodiment 2

FIG. 5 is a diagram illustrating a clipped part of a frame format, represented on a time-frequency coordinate plane, for a multicarrier modulation scheme according to an embodiment 2 of the present invention. In FIG. 5, the abscissa axis represents symbols located in the time direction, and the ordinate axis represents carriers located in the frequency direction. A number on the abscissa axis represents a symbol number in the time direction whereas a number on the ordinate axis represents a carrier number in the frequency direction. A mark ○ represents a phase reference pilot signal, a mark ● represents an amplitude reference pilot signal, and a mark X represents a data transmission signal. In the embodiment 2, as shown in FIG. 5, the phase reference pilot signal and the amplitude reference pilot signal are located alternately every other symbol on the k-th carrier in the time direction, and transmitted.

The modulation amplitude of the phase reference pilot signal is suppressed to zero at the transmission end. That is, the phase reference pilot signal is a null signal. Further, the reception end knows that the phase reference pilot signal is a null signal. The amplitude reference pilot signal is obtained through modulation using an amplitude value known to the reception end.

In the embodiment 2, it is preferable that a polarity of amplitude-modulation of each amplitude reference pilot signal which is located every other symbol in the time direction and transmitted is determined such that each polarity represents the same phase in a frequency of a carrier on which each amplitude reference pilot signal is transmitted.

In the embodiment 2, as in the multicarrier modulation scheme of the embodiment 1, at the reception end, a phase component of the transmission characteristic of the transmission channel can be estimated based on the phase reference pilot signal, and an amplitude component of the transmission characteristic of the transmission channel can be estimated based on the amplitude reference pilot signal. Based on a difference from the estimated phase of the phase reference pilot signal, and a difference from the estimated amplitude of the amplitude reference pilot signal, the reception end is allowed to estimate the transmission characteristic of the transmission channel, a frequency error between the transmission end and the reception end, a phase error therebetween, and the like, so as to correct the transmission characteristic, the frequency, the phase, and the like. In particular, in the multicarrier modulation scheme of the present embodiment, carriers for transmitting the phase reference pilot signals and the amplitude reference pilot signals are handled as pilot carriers.

As described above, in the multicarrier modulation scheme of the present embodiment, the phase reference pilot signals of which the modulation amplitudes are suppressed to zero, and the amplitude reference pilot signals each obtained through modulation performed by using a known amplitude are inserted between the data transmission signals at the transmission end, and therefore it is possible to accurately estimate the transmission characteristic of the transmission channel by performing a simplified calculation at the reception end without calculating an amount of interference to a pilot signal from a data transmission signal and performing a calculation for canceling the amount of interference at the transmission end. Further, in the multicarrier modulation scheme of the present invention, a phase difference of the phase reference pilot signal and an amplitude difference of the amplitude reference pilot signal are detected at the reception end, so as to enable estimation of the transmission characteristic of the transmission channel, a frequency error between the transmission end and the reception end, a phase error therebetween, and the like and correction of the transmission characteristic, the frequency, the phase, and the like.

Moreover, in the multicarrier modulation scheme of the present invention, transmission power for the phase reference pilot signal can be reduced.

In particular, in the multicarrier modulation of the present embodiment, when a polarity of amplitude-modulation of each amplitude reference pilot signal which is located every other symbol and transmitted is determined such that each polarity represents the same phase in a frequency of a carrier on which each signal is transmitted, the following effect can be exerted. Specifically, this phase relationship leads to increase of a specific interference to the phase reference pilot signals from each amplitude reference pilot signal. Therefore, an amplitude is increased in the quadarture axis of the phase reference pilot signal at the reception end, thereby enabling enhancement of an accuracy for detecting a phase based on the phase reference pilot signal.

Embodiment 3

FIG. 6 is a diagram illustrating a clipped part of a frame format, represented on a time-frequency coordinate plane, for a multicarrier modulation scheme according to an embodiment 3 of the present invention. In FIG. 6, the abscissa axis represents symbols located in the time direction, and the ordinate axis represents carriers located in the frequency direction. A number on the abscissa axis represents a symbol number in the time direction whereas a number on the ordinate axis represents a carrier number in the frequency direction. A mark ○ represents a phase reference pilot signal, and a mark X represents a data transmission signal. In the embodiment 3, as shown in FIG. 6, the phase reference pilot signals are located on the k-th carrier in the time direction and are continuously transmitted.

The modulation amplitude of the phase reference pilot signal is suppressed to zero at the transmission end. That is, the phase reference pilot signal is a null signal. Further, the reception end knows that the phase reference pilot signal is a null signal.

In the embodiment 3, as in the multicarrier modulation scheme of the embodiment 1, at the reception end, a phase difference caused by a carrier frequency difference from the transmission end and a sampling frequency difference therefrom can be estimated based on the phase reference pilot signal, so as to correct the phase. In particular, in the multicarrier modulation scheme of the present embodiment, carriers for transmitting the phase reference pilot signals are handled as pilot carriers.

As described above, in the multicarrier modulation scheme of the present embodiment, the phase reference pilot signals of which modulation amplitudes are suppressed to zero are inserted at the transmission end. Therefore, it is possible to accurately estimate a frequency error between the transmission end and the reception end, a phase error therebetween, and the like by performing a simplified calculation at the reception end without calculating an amount of interference to a pilot signal from a data transmission signal and performing a calculation for canceling the amount of interference at the transmission end, so as to correct the frequency and the phase. Further, in the multicarrier modulation scheme of the present embodiment, a phase difference of the phase reference pilot signal is detected at the reception end, so as to enable estimation of a frequency error between the transmission end and the reception end, a phase error therebetween, and the like, and correction of the frequency and the phase. Moreover, in the multicarrier modulation scheme of the present invention, transmission power for the phase reference pilot signal can be reduced.

In particular, the multicarrier modulation scheme of the present embodiment is applicable to multicarrier modulation using a pilot carrier for performing phase compensation.

Embodiment 4

FIG. 7 is a diagram illustrating a clipped part of a frame format, represented on a time-frequency coordinate plane, for a multicarrier modulation scheme according to an embodiment 4 of the present invention. In FIG. 7, the abscissa axis represents symbols located in the time direction, and the ordinate axis represents carriers located in the frequency direction. A number on the abscissa axis represents a symbol number in the time direction whereas a number on the ordinate axis represents a carrier number in the frequency direction. A mark ○ represents a phase reference pilot signal, a mark ● represents an amplitude reference pilot signal, and a mark X represents a data transmission signal. In the embodiment 4, as shown in FIG. 7, the phase reference pilot signal and the amplitude reference pilot signal are located alternately every other carrier on the m-th symbol in the frequency direction, and transmitted.

The modulation amplitude of the phase reference pilot signal is suppressed to zero at the transmission end. That is, the phase reference pilot signal is a null signal. Further, the reception end knows that the phase reference pilot signal is a null signal. The amplitude reference pilot signal is obtained through modulation using an amplitude value known to the reception end.

In the embodiment 4, as in the multicarrier modulation scheme of the embodiment 1, at the reception end, a phase component of the transmission characteristic of the transmission channel can be estimated based on the phase reference pilot signal, and an amplitude component of the transmission characteristic of the transmission channel can be estimated based on the amplitude reference pilot signal. In the embodiment 4, based on a difference from the estimated phase of the phase reference pilot signal, and a difference from the estimated amplitude of the amplitude reference pilot signal, the reception end is allowed to interpolate a phase component and an amplitude component of the transmission characteristic of the transmission channel so as to enable estimation and correction of the transmission characteristic of the transmission channel for the data transmission signal. In particular, in the multicarrier modulation scheme of the present embodiment, a symbol for transmitting the phase reference pilot signals and the amplitude reference pilot signals is handled as a pilot symbol.

Although, in the above description for the present embodiment, the phase reference pilot signals and the amplitude reference pilot signals are located on the m-th symbol and transmitted, and the data transmission signals are located in symbols preceding and following the m-th symbol and transmitted, the present embodiment is not limited thereto. For example, a symbol for transmitting the phase reference pilot signals and the amplitude reference pilot signals may be a head of a burst frame or a particular symbol may be located preceding and following the symbol and transmitted.

As described above, in the multicarrier modulation scheme of the present embodiment, the phase reference pilot signals of which modulation amplitudes are suppressed to zero, and the amplitude reference pilot signals each obtained through modulation performed by using a known amplitude are inserted between the data transmission signals at the transmission end, and therefore it is possible to accurately estimate the transmission characteristic of the transmission channel by performing a simplified calculation at the reception end without calculating an amount of interference to a pilot signal from a data transmission signal and performing a calculation for canceling the amount of interference at the transmission end. Further, in the multicarrier modulation scheme of the present invention, a phase difference of the phase reference pilot signal and an amplitude difference of the amplitude reference pilot signal are detected at the reception end, so as to enable estimation of the transmission characteristic of the transmission channel, a frequency error between the transmission end and the reception end, a phase error therebetween, and the like, and correction of the transmission characteristic, the frequency, the phase, and the like. Moreover, in the multicarrier modulation scheme of the present invention, transmission power for the phase reference pilot signal can be reduced. Furthermore, the transmission power reduced by the phase reference pilot transmission is used for the amplitude reference pilot signal, so that an accuracy for estimating the transmission characteristic of the transmission channel can be increasingly enhanced at the reception end.

In particular, the multicarrier modulation scheme of the present embodiment is applicable to multicarrier modulation using a pilot symbol or a reference symbol for estimating characteristic of the transmission channel.

Embodiment 5

FIG. 8 is a diagram illustrating a clipped part of a frame format, represented on a time-frequency coordinate plane, for a multicarrier modulation scheme according to an embodiment 5 of the present invention. In FIG. 8, the abscissa axis represents symbols located in the time direction, and the ordinate axis represents carriers located in the frequency direction. A number on the abscissa axis represents a symbol number in the time direction whereas a number on the ordinate axis represents a carrier number in the frequency direction. A mark ○ represents a phase reference pilot signal, a mark ● represents an amplitude reference pilot signal, and a mark X represents a data transmission signal. In the embodiment 5, as shown in FIG. 8, the phase reference pilot signal and the amplitude reference pilot signal are located alternately every other symbol and every other carrier on, for example, the m-th to the (m+3)th symbols, and transmitted.

The modulation amplitude of each phase reference pilot signal is suppressed to zero at the transmission end. That is, the phase reference pilot signal is a null signal. Further, the reception end knows that the phase reference pilot signal is a null signal. The amplitude reference pilot signal is obtained through modulation using an amplitude value known to the reception end.

In the embodiment 5, as in the multicarrier modulation scheme of the embodiment 1, at the reception end, a phase component of the transmission characteristic of the transmission channel can be estimated based on the phase reference pilot signal, and an amplitude component of the transmission characteristic of the transmission channel can be estimated based on the amplitude reference pilot signal. In the embodiment 5, based on a difference from the estimated phase of the phase reference pilot signal and a difference from the estimated amplitude of the amplitude reference pilot signal, the reception end is allowed to estimate the transmission characteristic of the transmission channel, a frequency error between the transmission end and the reception end, a phase error therebetween, and the like, so as to correct the transmission characteristic, the frequency, the phase, and the like. In particular, in the multicarrier modulation scheme of the present embodiment, symbols for transmitting the phase reference pilot signals and the amplitude reference pilot signals are handled as pilot symbols.

In the embodiment 5, it is preferable that a polarity of amplitude-modulation of each amplitude reference pilot signal which are located every other symbol in the time direction and transmitted is determined such that each polarity represents the same phase in a frequency of a carrier on which each amplitude reference pilot signal is transmitted.

In the embodiment 5, the number of pilot symbols constructed as above is preferably set so as to correspond to the length of a time response of a modulated wave of one symbol, or longer. Thus, an amplitude of the phase reference pilot signal received at the reception end in the ideal state is uniquely determined, and a symbol for uniquely determining a phase of the amplitude reference pilot signal is generated, and a phase and an amplitude of the transmission characteristic of the transmission channel can be simultaneously estimated for all carriers in that symbol.

Although in the above description for the present embodiment, the phase reference pilot signals and the amplitude reference pilot signals are located on the m-th to the (m+3)th symbols and transmitted, and the data transmission signals are located on symbols preceding and following the m-th to the (m+3) th symbols and transmitted, the embodiment 5 is not limited to this example. Specifically, the number of symbols for continuously transmitting the phase reference pilot signals and the amplitude reference pilot signals may be optionally chosen. Further, the symbols for continuously transmitting the phase reference pilot signals and the amplitude reference pilot signals may be a head portion of a burst frame or a particular symbol may be located preceding and following the symbols and transmitted.

As described above, in the multicarrier modulation scheme of the present embodiment, the phase reference pilot signals of which modulation amplitudes are suppressed to zero, and the amplitude reference pilot signals each obtained through modulation performed by using a known amplitude are inserted between the data transmission signals at the transmission end, and therefore it is possible to accurately estimate the transmission characteristic of the transmission channel by performing as implified calculation at the reception end without calculating an amount of interference to a pilot signal from a data transmission signal and performing a calculation for canceling the amount of interference at the transmission end. Further, in the multicarrier modulation scheme of the present invention, a phase difference of the phase reference pilot signal and an amplitude difference of the amplitude reference pilot signal are detected at the reception end, so as to enable estimation of the transmission characteristic of the transmission channel, a frequency error between the transmission end and the reception end, a phase error therebetween, and the like, and correction of the transmission characteristic, the phase, the frequency, the phase, and the like. Moreover, in the multicarrier modulation scheme of the present invention, transmission power for the phase reference pilot signal can be reduced. Furthermore, the transmission power reduced by the phase reference pilot transmission is used for the amplitude reference pilot signal, so that an accuracy for estimating the transmission characteristic of the transmission channel can be increasingly enhanced at the reception end.

In particular, the multicarrier modulation scheme of the present embodiment is further applicable to multicarrier modulation using a pilot symbol or a reference symbol for estimating characteristic of the transmission channel.

INDUSTRIAL APPLICABILITY

The multicarrier modulation scheme according to the present invention as well as the transmission apparatus and the reception apparatus using the scheme are capable of simplifying frame generation process, particularly for the OFDM/OQAM multicarrier modulation, at the transmission end, and reducing transmission power for transmitting a pilot signal. The multicarrier modulation scheme according to the present invention as well as the transmission apparatus and the reception apparatus using the scheme are applicable to modulation scheme used for radio communication such as digital terrestrial television broadcasting, a mobile telephone, and a wireless LAN, and wire communication such as XDSL and power line communication. Further, the multicarrier modulation scheme according to the present invention as well as the transmission apparatus and the reception apparatus using the scheme can be also applied to another communication and acoustic analysis.

The invention claimed is:

1. A multicarrier modulation method of using a multicarrier modulation scheme satisfying $v\tau=\frac{1}{2}$, wherein $\tau$ represents a symbol transmission interval, and $v$ represents frequency intervals of a plurality of carriers, the multicarrier modulation method comprising:
generating a multicarrier modulated signal by performing a modulation according to the multicarrier modulation scheme, such that the multicarrier modulated signal includes a phase reference pilot signal and satisfies $v\tau=\frac{1}{2}$,
wherein the phase reference pilot signal included in the multicarrier modulated signal is a null signal, which is obtained through a modulation performed using an amplitude value that is zero.

2. The multicarrier modulation method according to claim 1, wherein a plurality of the phase reference pilot signals are respectively located in a plurality of symbols, which are continuous in a time direction on a predetermined carrier.

3. The multicarrier modulation method according to claim 1, wherein the phase reference pilot signal is for estimating, at a reception end, a shift of a phase in a transmission path.

4. A multicarrier modulation method of using a multicarrier modulation scheme satisfying $v\tau=\frac{1}{2}$, wherein $\tau$ represents a symbol transmission interval, and $v$ represents frequency intervals of a plurality of carriers, the multicarrier modulation method comprising:
generating a multicarrier modulated signal by performing a modulation according to the multicarrier modulation scheme, such that the multicarrier modulated signal includes both a phase reference pilot signal and an amplitude reference pilot signal and satisfies $v\tau=\frac{1}{2}$,
wherein the phase reference pilot signal included in the multicarrier modulated signal is a null signal, which is obtained through a modulation performed using an amplitude value that is zero, and
wherein the amplitude reference pilot signal included in the multicarrier modulated signal is obtained through a modulation performed by using an amplitude value known to a reception end.

5. The multicarrier modulation method according to claim 4, wherein the phase reference pilot signal and the amplitude reference pilot signal are alternately located at every other symbol over a plurality of symbols which are continuous in a time direction on a predetermined carrier.

6. The multicarrier modulation method according to claim 4, wherein the phase reference pilot signal and the amplitude reference pilot signal are alternately located at every other carrier over a plurality of carriers which are continuous in a frequency direction in a predetermined symbol.

7. The multicarrier modulation method according to claim 4, wherein the phase reference pilot signal and the amplitude reference pilot signal are alternately located at every other carrier in a frequency direction, and are alternately located at every other symbol in a time direction.

8. The multicarrier modulation method according to claim 4, wherein the phase reference pilot signal is for estimating, at the reception end, a shift of a phase in a transmission path.

9. A transmission apparatus for generating a multicarrier modulated signal according to a multicarrier modulation scheme satisfying $\nu\tau=\frac{1}{2}$, wherein $\tau$ represents a symbol transmission interval, and $\nu$ represents frequency intervals of a plurality of carriers, and for transmitting the multicarrier modulated signal, the transmission apparatus comprising:
frame generation means for receiving transmission data, and for generating a frame signal including an amplitude value for generating a data transmission signal based on the transmission data, and including an amplitude value of zero for generating a phase reference pilot signal; and
multicarrier modulation means for generating the multicarrier modulated signal by performing a modulation according to the multicarrier modulation scheme, the multicarrier modulated signal being generated using amplitude value information included in the frame signal.

10. The transmission apparatus according to claim 9, wherein the phase reference pilot signal is for estimating, at a reception end, a shift of a phase in a transmission path.

11. A transmission apparatus for generating a multicarrier modulated signal according to a multicarrier modulation scheme satisfying $\nu\tau=\frac{1}{2}$, wherein $\tau$ represents a symbol transmission interval, and $\nu$ represents frequency intervals of a plurality of carriers, and for transmitting the multicarrier modulated signal, the transmission apparatus comprising:
frame generation means for receiving transmission data, and for generating a frame signal including an amplitude value for generating a data transmission signal based on the transmission data, including an amplitude value of zero for generating a phase reference pilot signal, and including an amplitude value, known to a reception end, for generating an amplitude reference pilot signal; and
multicarrier modulation means for generating the multicarrier modulated signal by performing a modulation according to the multicarrier modulation scheme, the multicarrier modulated signal being generated using amplitude value information included in the frame signal.

12. The transmission apparatus according to claim 11, wherein the phase reference pilot signal is for estimating, at the reception end, a shift of a phase in a transmission path.

13. A reception apparatus for receiving and demodulating a multicarrier modulated signal generated according to a multicarrier modulation scheme satisfying $\nu\tau=\frac{1}{2}$, wherein $\tau$ represents a symbol transmission interval, and $\nu$ represents frequency intervals of a plurality of carriers,
wherein the multicarrier modulated signal includes a phase reference pilot signal, which is a null signal obtained through a modulation performed by using an amplitude value that is zero, and
wherein the reception apparatus comprises:
multicarrier demodulation means for demodulating the received multicarrier modulated signal so as to generate a demodulation vector, and for outputting the demodulation vector; and
equalization means for receiving the demodulation vector, and for estimating a shift of a phase of the demodulation vector in accordance with the phase reference pilot signal, so as to compensate the phase.

14. The reception apparatus according to claim 13, wherein the equalization means includes:
phase estimation means for extracting the phase reference pilot signal included in the demodulation vector, and for estimating the shift of the phase of the demodulation vector; and
phase compensation means for compensating the phase of the demodulation vector in accordance with the shift of the phase estimated by the phase estimation means.

15. A reception apparatus for receiving and demodulating a multicarrier modulated signal generated by performing a modulation according to a multicarrier modulation scheme satisfying $\nu\tau=\frac{1}{2}$, wherein $\tau$ represents a symbol transmission interval, and $\nu$ represents frequency intervals of a plurality of carriers,
wherein the multicarrier modulated signal includes a phase reference pilot signal, which is a null signal obtained through a modulation performed using an amplitude value that is zero, and includes an amplitude reference pilot signal obtained through a modulation performed using an amplitude known to a reception end, and
wherein the reception apparatus comprises:
multicarrier demodulation means for demodulating the received multicarrier modulated signal so as to generate a demodulation vector, and for outputting the demodulation vector; and
equalization means for receiving the demodulation vector, for estimating a shift of a phase of the demodulation vector using the phase reference pilot signal, so as to compensate the phase, and for estimating a difference of an amplitude of the demodulation vector using the amplitude reference pilot signal, so as to compensate the amplitude.

16. The reception apparatus according to claim 15, wherein the equalization means includes:
phase estimation means for extracting the phase reference pilot signal included in the demodulation vector, and for estimating the shift of the phase of the demodulation vector;
phase compensation means for compensating the phase of the demodulation vector in accordance with the shift of the phase estimated by the phase estimation means;
amplitude estimation means for extracting the amplitude reference pilot signal included in the demodulation vector which is phase-compensated and is outputted by the phase compensation means, and for estimating a difference of an amplitude of the phase-compensated demodulation vector; and
amplitude compensation means for compensating, in accordance with the difference of the amplitude estimated by the amplitude estimation means, the amplitude of the demodulation vector which is phase-compensated and is outputted by the phase compensation means.

17. The reception apparatus according to claim 15, wherein the equalization means includes:
phase estimation means for extracting the phase reference pilot signal included in the demodulation vector, and for estimating the shift of the phase of the demodulation vector;
phase compensation means for compensating the phase of the demodulation vector in accordance with the shift of the phase estimated by the phase estimation means;
amplitude estimation means for extracting the amplitude reference pilot signal included in the demodulation vector which is phase-compensated and is outputted by the phase compensation means, and for estimating a difference of an amplitude of the phase-compensated demodulation vector; and compensation means for compensating, in accordance with the shift of the phase estimated by the phase estimation means and the difference of the amplitude estimated by the amplitude estimation means, the phase and an amplitude of the demodulation vector.

* * * * *